United States Patent
Koll

(10) Patent No.: US 10,676,054 B2
(45) Date of Patent: Jun. 9, 2020

(54) SECONDARY LIQUID CONTAINER FOR A MOTOR VEHICLE

(71) Applicant: Kautex Textron GmbH & Co. KG, Bonn (DE)

(72) Inventor: Friedbert Koll, Sinzig (DE)

(73) Assignee: KAUTEX TEXTRON GMBH & CO, KG, Bonn (DE)

( * ) Notice: Subject to any disclaimer, the term of this patent is extended or adjusted under 35 U.S.C. 154(b) by 3 days.

(21) Appl. No.: 14/359,448

(22) PCT Filed: Nov. 10, 2012

(86) PCT No.: PCT/EP2012/004683
§ 371 (c)(1),
(2) Date: May 20, 2014

(87) PCT Pub. No.: WO2013/075794
PCT Pub. Date: May 30, 2013

(65) Prior Publication Data
US 2014/0290756 A1    Oct. 2, 2014

(30) Foreign Application Priority Data

Nov. 21, 2011 (DE) .......................... 10 2011 118 929

(51) Int. Cl.
*B60R 16/08* (2006.01)
*B60S 1/50* (2006.01)
*F01N 3/20* (2006.01)

(52) U.S. Cl.
CPC ................ *B60R 16/08* (2013.01); *B60S 1/50* (2013.01); *F01N 3/2066* (2013.01);
(Continued)

(58) Field of Classification Search
CPC ...... B60R 16/08; B60S 1/50; Y10T 137/6881; F01N 2610/1466; F01N 3/2066; F01N 2610/1413
(Continued)

(56) References Cited

U.S. PATENT DOCUMENTS 2,139,476 A * 12/1938 Townsend ............. H01M 2/362
137/261
2,798,745 A * 7/1957 Nelson .................... F16L 39/02
285/124.1
(Continued)

FOREIGN PATENT DOCUMENTS

DE         1784086 U    2/1959
DE         10234105 A1  2/2004
(Continued)

OTHER PUBLICATIONS

English language PCT Search Report dated Jan. 24, 2013, received in corresponding PCT Application No. PCT/EP12/04683, 3 pgs.
(Continued)

*Primary Examiner* — Kenneth Rinehart
*Assistant Examiner* — James R Hakomaki
(74) *Attorney, Agent, or Firm* — Grossman, Tucker, Perreault & Pfleger, PLLC

(57) ABSTRACT

The invention relates to a secondary liquid container (1) for a motor vehicle, in particular a washing liquid container, with a filler pipe (3) and a filling bleed line (4). The filler pipe (3) and the filling bleed line (4) are connected via one common connection cross section to the secondary liquid container (1) at a single filling and bleeding connection (8) of the latter and are preferably produced in one piece.

16 Claims, 2 Drawing Sheets

(52) U.S. Cl.
CPC ............... *F01N 2610/1413* (2013.01); *F01N 2610/1466* (2013.01); *Y02A 50/2325* (2018.01); *Y10T 137/6881* (2015.04)

(58) Field of Classification Search
USPC ............... 141/59, 327, 326, 338, 349, 312; 220/86.2, 86.1, 562; 138/113; 137/15.18; 285/224, 235, 237, 238, 910
See application file for complete search history.

(56) References Cited

U.S. PATENT DOCUMENTS

| | | | |
|---|---|---|---|
| 3,187,936 A | 6/1965 | Downing | |
| 3,458,619 A * | 7/1969 | Prochaska | F16L 41/02 165/180 |
| 3,834,594 A * | 9/1974 | Schiemann | B65D 1/20 222/464.1 |
| 3,838,713 A * | 10/1974 | Tubbs | F16L 11/111 138/109 |
| 4,122,968 A * | 10/1978 | Germain | B60K 15/04 138/114 |
| 4,185,844 A | 1/1980 | Hubbard et al. | |
| 4,274,549 A * | 6/1981 | Germain | B60K 15/035 138/113 |
| 4,570,686 A * | 2/1986 | Devine | B67D 7/0488 138/113 |
| 4,718,568 A * | 1/1988 | Dal Palu | B60K 15/04 138/113 |
| 4,722,454 A * | 2/1988 | Fischer | B60K 15/04 137/587 |
| 4,730,652 A * | 3/1988 | Bartholomew | B60K 15/035 137/588 |
| 5,000,333 A | 3/1991 | Petrelli | |
| 5,111,858 A * | 5/1992 | Aittama | B60K 15/04 141/312 |
| 5,427,263 A | 6/1995 | Bowles | |
| 5,466,016 A * | 11/1995 | Briody | B60K 15/04 220/86.2 |
| 5,704,337 A * | 1/1998 | Stratz | B60K 15/03504 123/516 |
| 5,853,025 A * | 12/1998 | Daneshvar | B60S 1/481 137/565.34 |
| 5,954,367 A * | 9/1999 | Doll | B60K 15/035 280/834 |
| 6,044,517 A * | 4/2000 | Zendler | B60S 1/50 137/587 |
| 6,196,280 B1 * | 3/2001 | Tate, Jr. | B60K 15/04 141/301 |
| 6,427,710 B1 * | 8/2002 | Griesbaum | B60K 15/03504 137/15.09 |
| 6,491,030 B2 * | 12/2002 | Zapp | B60K 15/035 123/516 |
| 6,698,799 B2 * | 3/2004 | Anderson | B60K 15/04 285/139.1 |
| 6,761,380 B2 * | 7/2004 | Pachciarz | B60K 15/04 277/644 |
| 6,874,550 B2 * | 4/2005 | Brooker | B64D 11/04 141/299 |
| 7,017,629 B2 | 3/2006 | Winterling | |
| 7,168,466 B2 * | 1/2007 | Ganachaud | B60K 15/04 141/286 |
| 7,302,936 B2 * | 12/2007 | Stolarz | B60K 15/01 123/468 |
| 7,544,328 B2 * | 6/2009 | Osaku | B01D 53/9431 422/509 |
| 7,735,672 B2 * | 6/2010 | Voss, III | B60K 15/0406 220/202 |
| 2002/0117233 A1 * | 8/2002 | Kellogg | F01M 11/00 141/98 |
| 2002/0130515 A1 * | 9/2002 | Mlyajima | F16L 37/008 285/201 |
| 2005/0016619 A1 | 1/2005 | Winterling | |
| 2006/0180958 A1 | 8/2006 | McClung | |
| 2006/0185760 A1 * | 8/2006 | Matsuzaki | B60K 15/04 141/286 |
| 2007/0227621 A1 * | 10/2007 | Bonner | B65D 25/48 141/242 |
| 2008/0173358 A1 * | 7/2008 | Guldi | G05D 11/133 137/351 |
| 2008/0311329 A1 * | 12/2008 | Inaba | B32B 1/08 428/36.91 |
| 2009/0013670 A1 * | 1/2009 | Cooke | F01N 3/2066 60/286 |
| 2009/0166367 A1 * | 7/2009 | Blieux | B29C 49/20 220/694 |
| 2010/0236658 A1 * | 9/2010 | Voss, III | B60K 15/0406 141/59 |
| 2010/0275650 A1 * | 11/2010 | Hirst | A01N 1/00 63/1.14 |
| 2012/0228292 A1 * | 9/2012 | Doble | B60K 15/04 220/86.2 |

FOREIGN PATENT DOCUMENTS

| | | |
|---|---|---|
| DE | 102006037556 A1 | 2/2008 |
| FR | 2936837 A1 | 4/2010 |
| JP | 06016108 A | 1/1994 |
| JP | 08002265 A | 1/1996 |
| JP | 2003220627 A | 8/2003 |
| JP | 2006111131 A | 4/2006 |
| JP | 2010070062 A | 4/2010 |
| JP | 2010089702 A | 4/2010 |
| RU | 2228864 C2 | 5/2004 |
| WO | WO 8604319 * | 7/1986 |

OTHER PUBLICATIONS

English language PCT Written Opinion dated Jan. 24, 2013, received in corresponding PCT Application No. PCT/EP12/04683, 4 pgs.

English translation of Japanese Office Action dated Jul. 22, 2015, received in corresponding Japanese Application No. 2014-541559, 5 pgs.

English translation of Russian Decision to Grant received on Aug. 31, 2015, received in corresponding Russian Application No. 2014125068/11(040772), 4 pgs.

Office Action from related Indian Appln. No. 4425/CHENP/2014 dated Jan. 25, 2019. English translation incorporated into Office Action.

* cited by examiner

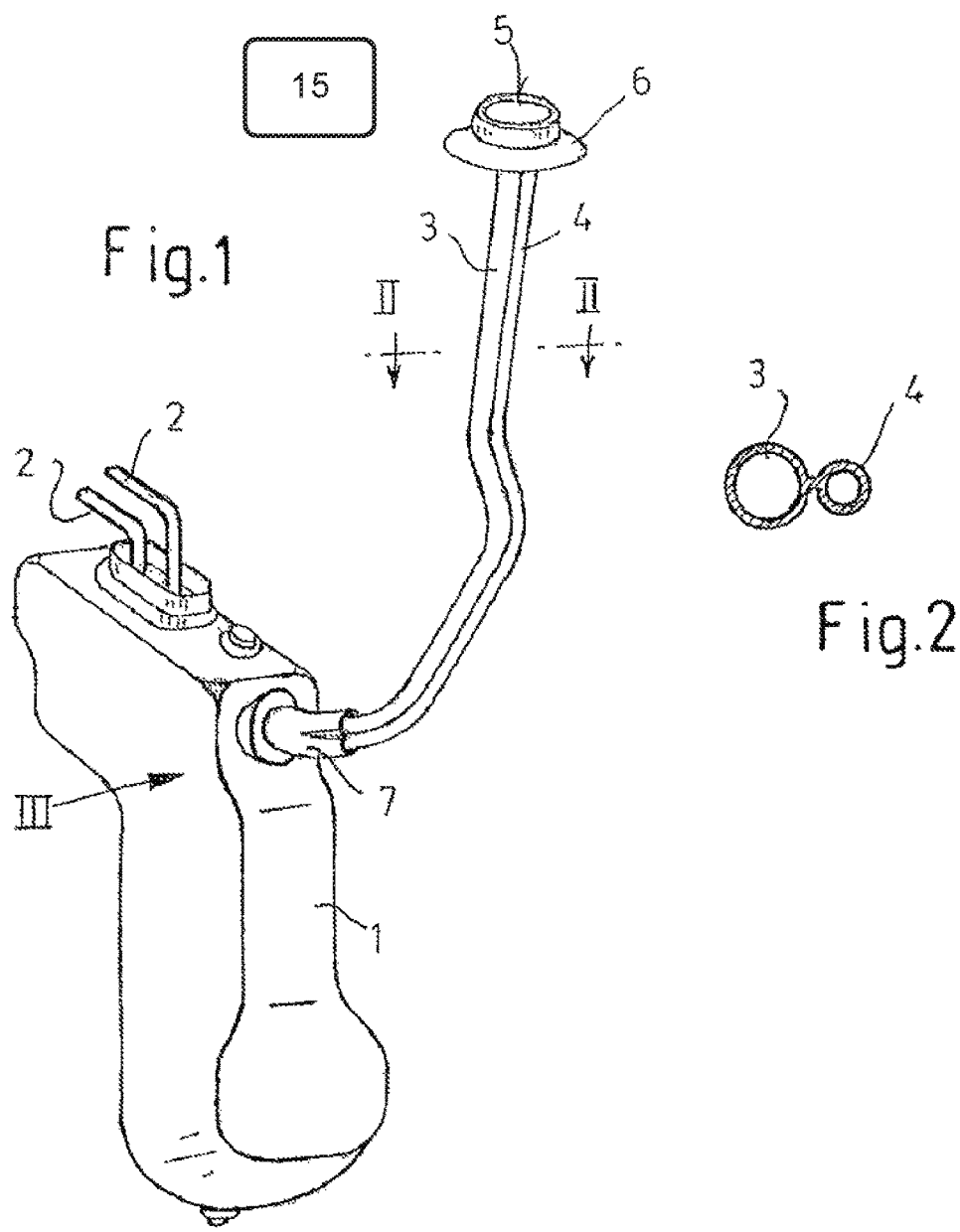
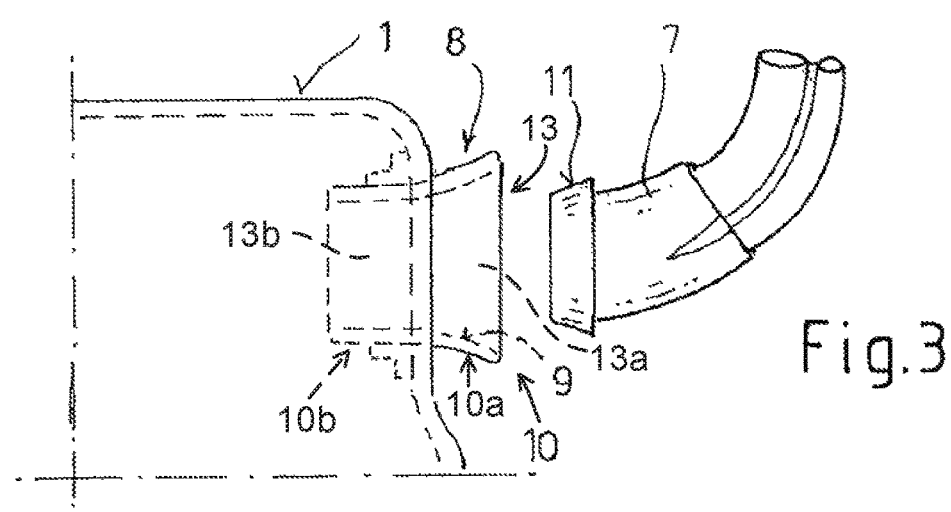

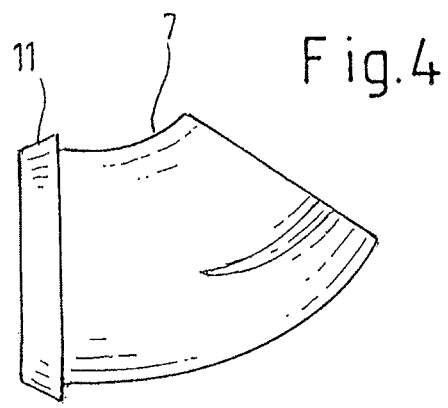
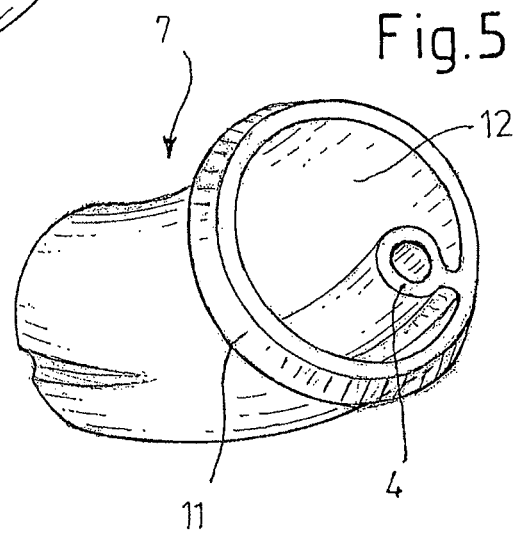
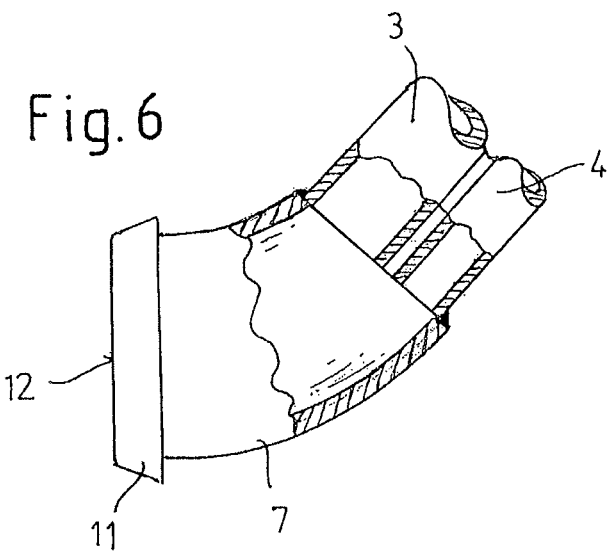

SECONDARY LIQUID CONTAINER FOR A MOTOR VEHICLE

FIELD

The invention relates to a secondary liquid container for a motor vehicle, in particular a washing liquid container.

BACKGROUND

Such secondary liquid containers are predominantly optimized in terms of construction space so as to be accommodated in motor vehicles. They are sometimes no longer arranged in the motor vehicle engine space which in any case has restricted dimensioning, but instead, for example, in one of the wheel cases or below the side trims in the back of the motor vehicle. Known containers consist of thermoplastic and are often extrusion blow-moulded. On account of the relatively concealed arrangement in the motor vehicle, they are provided with long filler pipes which are fitted at a location on the motor vehicle which is easily accessible for the motor vehicle user. The filler pipe is usually connected to the container in the upper region of the latter in the area where the maximum permissible liquid level is, that is to say above the floor, although, depending on the configuration of the container and the fitting of the filler pipe, the situation cannot be avoided where the mouth of the filler pipe issuing into the container may possibly be connected to the container even below the maximum permissible liquid level of the latter. So that the bleeding of the container during filling can be ensured, known containers are provided either with a bleeding valve or with a bleeding hose. The provision of bleeding valves is complicated in structural terms and the fitting of bleeding hoses is likewise complicated, particularly during the final assembly of the motor vehicle.

SUMMARY

The object on which the invention is based, therefore, is to improve in this respect a secondary liquid container of the type mentioned in the introduction.

The object is achieved by means of a secondary liquid container for a motor vehicle, in particular by means of a washing liquid container, with a filler pipe which is connected to the container and with a filling bleed line running approximately parallel to the filler pipe, the filler pipe and the filling bleed line being connected to the container at a single filling and bleeding connection, and filling and bleeding being provided via one common connection cross section. Such a design of the filler pipe of the secondary liquid container appreciably simplifies the construction of the container. Secondary liquid containers which may also be considered are, for example, urea containers for selective catalytic exhaust gas reduction.

For example, the filler pipe and the filling bleed line may be produced in one piece, so that the filling bleed line does not have to be mounted and fastened separately on the vehicle body. There is also no need in this case for separate fastening and/or connection to the filler pipe.

The filling and bleeding connection may be designed as a leadthrough orifice of preferably round cross section in the container.

In an especially simple variant of the secondary liquid container according to the invention, there is provision for the filler pipe to be plugged releasably into the leadthrough orifice. In this case, for example, the leadthrough orifice may be provided with a leadthrough seal. The mounting of the secondary liquid container in the motor vehicle is thereby appreciably simplified.

In an expedient variant of the secondary liquid container according to the invention, there is provision for the filling bleed line to be routed in the connection piece as far as a mouth cross section of the said connection piece separately from the filler pipe. In other words, the filling bleed line is continued into the connection cross section of the connection piece.

There may especially preferably be provision for the filler pipe to comprise a connection piece which is adapted cross-sectionally to the filling and bleeding connection. It is thereby possible to configure the filler pipe, for example with a filling bleed line formed in one piece, so as to have any desired outer contour, whereas the filling and bleeding connection of the container preferably comprises a leadthrough orifice of round cross section.

The connection piece expediently forms a convergence of the filler pipe and of the filling bleed line to the common connection cross section.

In a preferred variant of the secondary liquid container according to the invention, there is provision for the filler pipe and the filling bleed line to be extrusion blow-moulded in one piece from thermoplastic.

The connection piece may, for example, be injection-moulded from thermoplastic.

If the connection piece is provided with at least one integrally formed seal running around on the outside, there is no longer any need for a separate leadthrough seal in the region of the filling and bleeding connection of the container. The connection piece may alternatively be provided with a groove which runs around on the outside and into which an O-ring seal is inserted. In the production of the connection piece from thermoplastic by injection moulding, it is alternatively also possible for a peripheral sealing lip made from a thermoplastic elastomer to have been injection-moulded onto the connection piece.

In an especially simple and alternative refinement of the secondary liquid container according to the invention, there is provision for the connection piece to have at least one diametral step from an entry diameter to a connection diameter and for the filling bleed line to be connected in the region of a flow dead zone formed by the diametral step for the inflowing liquid. In this case, for example, the connection piece, filler pipe and filling bleed line may be produced in one piece. The entire component may thus have been obtained, for example, by extrusion blow-moulding from thermoplastic. A diametral step in the context of the invention is to be understood as meaning a variation in diameter from a smaller diameter to a larger diameter.

Alternatively, it is possible to produce the filler pipe and connection piece, which preferably possesses a round connection cross section, in one part and to connect the filling bleed line as a separate component via a nipple to the connection piece, preferably in the region of the diametral step of the latter.

FIGURES

The invention is explained below by means of two exemplary embodiments illustrated in the drawings in which:

FIG. 1 shows a diagrammatic perspective view of a secondary liquid container according to the invention, FIG. 2 shows a section along the lines II-II in FIG. 1, FIG. 3 shows an enlarged view, in the form of a detail, of the part in FIG. 2 identified by the arrow III, FIG. 4 shows a side view of the connection piece according to the invention, FIG. 5 shows a perspective view of the connection piece according to the invention which shows the outflow-side end of the latter, and FIG. 6 shows a part-section through an alternative embodiment of the filler pipe according to the invention.

DETAILED DESCRIPTION

Reference is made first to FIG. 1 which shows a first exemplary embodiment of the secondary liquid container 1 according to the invention. The secondary liquid container 1 is designed as a washing liquid container for a motor vehicle 15. In the exemplary embodiment described, it is extrusion blow-moulded in one piece from thermoplastic. Inside the secondary liquid container 1 is arranged a feed pump, not illustrated, for example for washing liquid, which is connected via the lines 2 to a windscreen cleaning system for a motor vehicle 15.

A filler pipe for the secondary liquid container is designated by 3, a filling bleed line 4 being formed in one piece on the said filler pipe. The filler pipe 3 with the integrally formed filling bleed line may have been produced, for example, as what is known as a 3D blow moulding by what is known as low-waste extrusion blow-moulding, for example by suction blow-moulding. An end piece 6 surrounding the filler orifice 5 is placed onto the filler pipe 3 and the filling bleed line 4 on the inflow side/filling side, and a connection piece 7, which is adapted cross-sectionally to a filling and bleeding connection 8 of the secondary liquid container 1, is attached to the filler pipe 3 and the filling bleed line 4 on the outflow side. The filling and bleeding connection 8 is designed as a leadthrough orifice with a circular cross section and with a leadthrough seal 9. The leadthrough seal 9 forms a sleeve-shaped (annular) sealing collar 10 (having a conical annular portion 10a disposed outside the secondary liquid container 1 defining a conical portion 13a of the leadthrough orifice 13 and a cylindrical annular portion 10b disposed inside the secondary liquid container 1 defining a cylindrical portion 13b of the leadthrough orifice 13) which cooperates with a sealing seat 11 of the connection piece 7. Instead of the sealing seat 11, the connection piece 7 may also be provided with a peripheral sealing lip or with an integrally formed peripheral sealing collar.

The connection piece 7 is preferably injection-moulded from thermoplastic and is connected to the filling bleed line 4 and the filler orifice 5 on the side facing away from the secondary liquid container 1, for example is welded to the filling bleed line 4 and the filler pipe 3 in this region.

As will be gathered particularly from FIG. 5, the filling bleed line 4 is continued inside the connection piece 7 into the mouth cross section 12 of the connection piece 7.

The end piece 6, which may likewise be injection-moulded from thermoplastic, is likewise welded to the filling bleed line 4 and the filler pipe 3. The said end piece can be covered by a closing flap, not illustrated, or by a closing plug.

In the variant to the connection piece 7, as illustration in FIG. 6, the filler pipe and the filling bleed line 4 are connected to the connection piece 7 on its side remote from the mouth cross section 12. The connection piece 7 is designed as an adapter from the non-round overall cross section/enveloping curve of the filler pipe 3 and of the filling bleed line 4 to the cross section of the filling and bleeding connection 8, the filler pipe 3 and the filling bleed line 4 not being routed separately from one another into the mouth cross section 12 of the connection piece 7. Instead, the connection piece 7 defines an adaptation of diameter from the filling bleed line 4 to the cross section of the filling and bleeding connection 8. The filling bleed line 4 is arranged in the connection piece 7 in the region of a flow deadzone in the liquid passing through the filler pipe 3, so that the bleed stream escaping during the filling of the secondary liquid container 1 can nevertheless emerge, parallel to the inflowing liquid, out of the filling bleed line 4.

In this case, the connection piece may have been produced in one piece with the filler pipe 3 and also in one piece with the filler pipe 3 and the connection piece 7. It is likewise conceivable that the connection piece 7 has two nipples, to which the filler pipe 3 and the filling bleed line 4 are connected in each case.

As will be gathered particularly from FIG. 1, the filler pipe 3 and the filling bleed line 4 are connected approximately in the upper third of the secondary liquid container 1 in the installation position of the latter, specifically in a region which is arranged slightly below the maximum permissible liquid level inside the secondary liquid container 1.

LIST OF REFERENCE SYMBOLS

1 Secondary liquid container
2 Lines
3 Filler pipe
4 Filling bleed line
5 Filler orifice
6 End piece
7 Connection piece
8 Filling and bleeding connection
9 Leadthrough seal
10 Sealing collar
11 Sealing seat
12 Mouth cross section

What is claimed is:

1. A liquid container for a motor vehicle, comprising:
a secondary liquid container configured to contain a liquid and provide the liquid therein to the motor vehicle during operation of the motor vehicle,
a filler pipe connected to the secondary liquid container and with a filling bleed line running approximately parallel to the filler pipe, the secondary liquid container arranged downstream of the filler pipe such that, when the liquid is provided to the liquid container, the liquid will flow from the filler pipe downstream to the secondary liquid container,
wherein the filler pipe and the filling bleed line are connected to the secondary liquid container via a single filling and bleeding connection of the secondary liquid container, filling and bleeding being provided via one common connection cross section;
wherein the filler pipe comprises a connection piece configured to fit cross-sectionally into the filling and bleeding connection of the secondary liquid container and connect with the filling and bleeding connection of the secondary liquid container;
wherein the connection piece forms a convergence of the filler pipe and of the filling bleed line to the one common connection cross section;
wherein the filler pipe and the filling bleed line are connected to the connection piece and routed in the connection piece, wherein the filler bleed line is routed in the connection piece separately from the filler pipe and extends as far as a mouth cross section of the connection piece, wherein the filler pipe and the filling bleed line are connected to the connection piece on a side remote from the mouth cross section, and the mouth cross section issues into the secondary liquid container; and wherein the secondary liquid container is connectable to at least one downstream operating fluid line of a system of the motor vehicle to provide the liquid from the secondary liquid container downstream to the motor vehicle during operation of the motor vehicle.

2. The liquid container according to claim 1, wherein the filler pipe and the filling bleed line are provided in one piece.

3. The liquid container according to claim 1, wherein the filling and bleeding connection comprises a leadthrough orifice of round cross section in the secondary liquid container.

4. The liquid container according to claim 3, wherein the connection piece of the filler pipe is releasably plugged into the leadthrough orifice.

5. The liquid container according to claim 1, wherein the filler pipe and the filling bleed line are blow-moulded in one piece from thermoplastic.

6. The liquid container according to claim 1, wherein the connection piece is injection-moulded from thermoplastic.

7. The liquid container according to claim 6, wherein the connection piece is provided with at least one integrally formed seal.

8. The liquid container according to claim 1, wherein the connection piece has a diametral step from an entry diameter to a connection diameter.

9. The liquid container according to claim 8, wherein the filler pipe and the filling bleed line are not routed into a common mouth cross section of the connection piece.

10. The liquid container according to claim 1, wherein the filling and bleeding connection is provided by an annular collar.

11. The liquid container according to claim 10, wherein the connection piece is configured to fit cross-sectionally into a leadthrough orifice in the annular collar.

12. The liquid container according to claim 10, wherein the annular collar has a conical annular portion disposed outside the secondary liquid container.

13. The liquid container according to claim 12, wherein the conical annular portion defines a conical portion of a leadthrough orifice extending through the annular collar.

14. The liquid container according to claim 10, wherein the annular collar has a cylindrical annular portion disposed inside the secondary liquid container.

15. The liquid container according to claim 14, wherein the cylindrical annular portion defines a cylindrical portion of a leadthrough orifice extending through the annular collar.

16. A liquid container for a motor vehicle, comprising:
a secondary liquid container configured to contain a liquid and provide the liquid therein to the motor vehicle during operation of the motor vehicle,
a filler pipe connected to the secondary liquid container and with a filling bleed line running approximately parallel to the filler pipe, the secondary liquid container arranged downstream of the filler pipe such that, when the liquid is provided to the secondary liquid container, the liquid will flow from the filler pipe downstream to the secondary liquid container,
at least one fluid line connection spaced apart from the filler pipe and the filling bleed line, the at least one fluid line connection connectable with at least one downstream operating fluid line of a system of the motor vehicle such that, when the liquid is in the secondary liquid container, the liquid is providable to the motor vehicle downstream of the secondary liquid container;
wherein the filler pipe and the filling bleed line are connected to the secondary liquid container via a single filling and bleeding connection of the secondary liquid container, filling and bleeding being provided via one common connection cross section;
wherein the filler pipe comprises a connection piece configured to fit cross-sectionally into the filling and bleeding connection of the secondary liquid container and connect with the filling and bleeding connection of the secondary liquid container;
wherein the connection piece forms a convergence of the filler pipe and of the filling bleed line to the one common connection cross section;
wherein the filler pipe and the filling bleed line are connected to the connection piece and routed in the connection piece, wherein the filler bleed line is routed in the connection piece separately from the filler pipe and extends as far as a mouth cross section of the connection piece, wherein the filler pipe and the filling bleed line are connected to the connection piece on a side remote from the mouth cross section, and the mouth cross section issues into the secondary liquid container.

* * * * *